UNITED STATES PATENT OFFICE.

FRANKLIN RUDOLPH, OF CHICAGO, ILLINOIS.

PROCESS FOR CRYSTALLIZING TIN-PLATE.

SPECIFICATION forming part of Letters Patent No. 262,481, dated August 8, 1882.

Application filed January 27, 1882. (No specimens.)

*To all whom it may concern:*

Be it known that I, FRANKLIN RUDOLPH, of Chicago, in the county of Cook and State of Illinois, have invented certain new and useful Improvements in Processes of Crystallizing Tin-Plate; and I do hereby declare that the following is a full, clear, and exact description thereof.

This invention relates to crystallizing the surfaces of tin-plate by heating and treating with acids.

Heretofore in crystallizing tin plates it has been customary to first cleanse the plates from grease, then either to wash or not to wash such plates, then to heat the same until the tin begins to melt, and then while hot to apply an acid or acids, said plates being sometimes cooled by either immersing the same in water or sprinkling water thereupon, the plates being finally dried and japanned. I am also aware that it is old to apply the acid in a heated state.

By the methods heretofore practiced it was found that the designs were not brought out as distinctly and vividly as desired; and it is the object of my improvements to facilitate the crystallization of tin plates and render the crystallization more vivid and bright than heretofore, it being found in practice that my process will bring about a dark underground shading and an increased contrast of deeper and lighter colors, and will give to the figures formed on the surfaces of the tin plates specifical, transitive, and powerful expressions, and that manipulation consists in heating the plates after the acid is applied.

To carry my invention into effect I first rub the tin plates with moistened whiting for removing all oily and greasy matter that may adhere thereto. Next I cover them with a mixture of acids, preferably consisting of one-quarter measure of nitric acid and one-quarter of muriatic acid to one-half water, and with this coating of acid I expose the plates to the fire, which produces the above effect. After the tin plates have been thus treated they must be washed off and dried, when they will be ready for japanning or varnishing, as may be desired. The acids will affect the tin-coated surfaces of the plates with more rapidity and intensity while they are in a heated condition, and therefore will bring out the figures of crystallization more prominent and in less time than when the plates are exposed to the acids while cold.

What I claim is—

The process herein described of crystallizing tin plates, consisting of first removing the oil or greasy matter adhering thereto, then covering said plates with a mixture of acids, and then exposing such plates with the acid thereon to the action of heat, substantially as set forth.

In testimony that I claim the foregoing as my invention I affix my signature in presence of two witnesses.

FRANKLIN RUDOLPH.

Witnesses:
 F. W. KASEHAGEN,
 F. WILLIAMS.